(12) United States Patent
Salesse-Lavergne (10) Patent No.: US 11,015,931 B2
(45) Date of Patent: May 25, 2021

(54) METHOD AND A DEVICE FOR DETERMINING AND DISPLAYING A FLYAWAY DISTANCE FOR A ROTORCRAFT WHILE TAKING ACCOUNT OF THE HEIGHT OF WAVES

(71) Applicant: AIRBUS HELICOPTERS, Marignane (FR)

(72) Inventor: Marc Salesse-Lavergne, Allauch (FR)

(73) Assignee: AIRBUS HELICOPTERS, Marignane (FR)

( * ) Notice: Subject to any disclaimer, the term of this patent is extended or adjusted under 35 U.S.C. 154(b) by 37 days.

(21) Appl. No.: 16/419,439

(22) Filed: May 22, 2019

(65) Prior Publication Data

US 2019/0360805 A1    Nov. 28, 2019

(30) Foreign Application Priority Data

May 24, 2018 (FR) ...................................... 1800508

(51) Int. Cl.
*G01C 13/00* (2006.01)
*G05D 1/04* (2006.01)
(Continued)

(52) U.S. Cl.
CPC .......... *G01C 13/004* (2013.01); *G05D 1/042* (2013.01); *G05D 1/105* (2013.01); *G06F 17/11* (2013.01); *B64C 27/12* (2013.01)

(58) Field of Classification Search
CPC .......... G01P 13/025; G01P 5/165; G01P 5/14; G01P 5/16; G01P 13/02; G01P 5/00;
(Continued)

(56) References Cited

U.S. PATENT DOCUMENTS 4,023,409 A    5/1977    Durand
6,195,598 B1   2/2001    Bosqui et al.
(Continued)

FOREIGN PATENT DOCUMENTS

FR    2282644 A1    3/1976
FR    2565270 A1    12/1985
(Continued)

OTHER PUBLICATIONS

French Search Report for French Application No. FR 1800508, Completed by the French Patent Office, dated Feb. 4, 2019, 8 pages.
(Continued)

*Primary Examiner* — Andre J Allen
(74) *Attorney, Agent, or Firm* — Brooks Kushman P.C.

(57) ABSTRACT

A method and a device for determining and displaying a flyaway distance for a rotorcraft in the event of an engine of the rotorcraft failing, and while taking account of the height of waves being overflown by the rotorcraft. The method includes a first determination for determining a flyaway distance of the rotorcraft in the event of a failure of an engine and under current flying conditions, a second determination for determining a maximum altitude of the waves being overflown by the rotorcraft and displaying the flyaway (Continued)

distance and the maximum altitude on a display instrument of the rotorcraft indicating the relative height of the rotorcraft or else its altitude. A safety margin is preferably added to the maximum altitude of the waves, or else to the flyaway distance of the rotorcraft.

20 Claims, 2 Drawing Sheets (51) Int. Cl.
    *G05D 1/10*     (2006.01)
    *G06F 17/11*     (2006.01)
    *B64C 27/12*     (2006.01)

(58) Field of Classification Search
CPC .. G01P 5/02; G01P 21/025; G01P 5/12; G01P 5/26; G01P 5/005; G01P 5/175; G01P 5/18; G01P 5/24; G01P 13/045; G01P 15/036; G01P 1/02; G01P 21/00; G01P 3/62; G01P 5/07; G01P 5/08; G01P 5/245; B64D 43/02; B64D 15/20; B64D 43/00; B64D 15/12; B64D 1/18; B64D 2033/0286; B64D 33/02; B64D 33/08; B64D 45/00; G05D 1/0094; G05D 1/104; G05D 1/0676; G05D 1/0027; G05D 1/0044; G05D 1/042; G05D 1/0858; G05D 1/101; G05D 1/106; G05D 1/0077; G05D 1/0088; G05D 1/105; G05D 19/02; G05D 1/0022; G05D 1/0202; G05D 1/0204; G05D 1/0206; G05D 1/0276; G05D 1/0661; G05D 1/0808; G05D 1/102; G05D 1/12; G01C 13/004; G01C 13/002; G01C 13/006; G01C 13/00; G01C 5/04; G01C 5/06; G01C 13/008; G01C 21/16
USPC ................................. 73/170.02, 170.31
See application file for complete search history.

(56) References Cited

U.S. PATENT DOCUMENTS

| | | | |
|---|---|---|---|
| 7,756,612 | B2 | 7/2010 | Salesse-Lavergne |
| 9,387,938 | B1 | 7/2016 | Vanderkamp et al. |
| 2008/0215197 | A1 | 9/2008 | Pitard et al. |
| 2009/0140885 | A1 | 6/2009 | Rogers et al. |
| 2013/0221153 | A1 | 8/2013 | Worsham, II et al. |
| 2019/0315462 | A1* | 10/2019 | Skladman ................ B64D 3/02 |
| 2019/0377366 | A1* | 12/2019 | Worsham, II .......... G05D 1/042 |
| 2020/0122856 | A1* | 4/2020 | Esimai .................... B64C 19/02 |

FOREIGN PATENT DOCUMENTS

| | | |
|---|---|---|
| FR | 2900385 A1 | 11/2007 |
| JP | H0743109 A | 2/1995 |
| RU | 2024034 C1 | 11/1994 |
| RU | 2557999 C1 | 7/2015 |
| RU | 2563314 C1 | 9/2015 |

OTHER PUBLICATIONS

Scott, Mark W. et al. Aircraft Design Consideration to Meet One Engine Inoperative (OEI) Safety Requirements. National Aeronautics and Space Administration. Ames Research Center, Moffett Field, California. Aug. 2012. 13 pages.

Wood, Tom et al. One Engine Inoperative (OEI) and Autorotation for Heavy Rotocraft System. National Aeronautics and Space Administration. Ames Research Center, Moffett Field, California. Aug. 2012. 16 pages.

European Search Report dated Feb. 15, 2021, Application No. 19 174 905.0-1203, Applicant Airbus Helicopters, 11 Pages.

\* cited by examiner

METHOD AND A DEVICE FOR DETERMINING AND DISPLAYING A FLYAWAY DISTANCE FOR A ROTORCRAFT WHILE TAKING ACCOUNT OF THE HEIGHT OF WAVES

CROSS-REFERENCE TO RELATED APPLICATIONS

This application claims priority to French patent application No. FR 1800508 filed on May 24, 2018, the disclosure of which is incorporated in its entirety by reference herein.

BACKGROUND OF THE INVENTION

(1) Field of the Invention

The present invention relates to the general technical field of providing assistance in the piloting of aircraft, and in particular assistance in the piloting of a rotorcraft having a plurality of engines and in the event of one of the engines failing.

The present invention relates to a method of determining and displaying a flyaway distance for a rotorcraft relative to a free water surface while taking account of the height of waves, and also to a device that performs the method.

(2) Description of Related Art

A rotorcraft, also known as a "rotary wing aircraft", is a flying machine that differs from other powered aircraft mainly by its ability both to fly in cruising flight at high speeds and also to fly at low speeds or to hover. That ability is obtained by making use of at least one rotary wing, such as a main rotor, having an axis of rotation that its substantially vertical.

A rotorcraft may have one or more engines, typically two engines, for the purpose of driving the main rotor in rotation. The context of the invention is limited to rotorcraft having at least two engines.

Furthermore, rotorcraft often fly at very low altitude. In particular, in the context of search and rescue missions at sea, rotorcraft are used daily for rescuing casualties. In such search and rescue missions, a rotorcraft needs to be able to operate in complete safety by hovering or flying at low speeds and at very low altitude in an environment that is often disturbed, e.g. a heavy sea, a strong wind, and poor visibility. Rotorcraft perform operations of winching emergency crews, and rescuing casualties from boats or even directly from the sea.

In order to enable such emergency actions to be taken, the rotorcraft needs to be caused to hover vertically above casualties in the sea or to fly forwards at low speeds when the casualties are on board a moving boat. Such hovering or low speed flights are stages of flight that put a great strain on the engines of the rotorcraft. Specifically, the rotorcraft used for such missions generally have at least two engines in order to be capable of delivering sufficient power and of mitigating the possible failure of one of the engines.

Nevertheless, if an engine failure takes place during such an emergency operation, the rotorcraft may find itself in a situation that is dangerous, given its low altitude and its low speed of advance.

Specifically, in the event of an engine failure, the rotorcraft must rapidly regain an airspeed that enables it to maintain an altitude that is constant or even to climb a little, with only the power that is available from the engine(s) still in operation. On a rotorcraft, the power needed to maintain an altitude depends on the flying conditions of the rotorcraft, and in particular on the airspeed of the rotorcraft, but also on outside temperature, on atmospheric pressure, also referred to as "altitude pressure", and on the current weight of the rotorcraft.

Under such circumstances, in the event of an engine failure taking place during hovering flight or flight at a low speed of advance, the rotorcraft needs to be accelerated quickly in order to reach some minimum airspeed, with this rapid acceleration giving rise to the rotorcraft losing altitude.

Nevertheless, in order to compensate the failure of an engine, each engine that remains in operation is caused to operate in special modes referred to as "one engine inoperative" (OEI) modes, in which extra mechanical power is made available for safety purposes, but only for a limited time. Under such circumstances, the use of such special OEI modes makes it possible to limit this loss of altitude, but without eliminating it completely. This loss of altitude thus constitutes a flyaway distance for the rotorcraft to enable the rotorcraft to reach its minimum airspeed in the event of a failure of an engine, and consequently to guarantee that hovering flight or flight at a low speed of advance is performed in a manner that is safe, with this flyaway distance being measured vertically, i.e. parallel to the direction of the Earth's gravity.

Consequently, for safety reasons, it is therefore important, or indeed essential at all times, and in particular when a rotorcraft is flying at an airspeed that is low, or even zero, for the crew of the rotorcraft to know how much altitude the rotorcraft would need to lose under its current flying conditions in order to enable it to reach its minimum airspeed in the event of an engine failing.

Very many tests are carried out while developing and certifying a rotorcraft in order to demonstrate the performance of the rotorcraft after an engine failure and to determine such losses of altitude as a function of various flying conditions that the rotorcraft might encounter. These losses of altitude depend in particular on the weight of the rotorcraft, on wind conditions, on the maneuver being executed by the pilot of the rotorcraft, and on the performance of the engine(s) remaining in operation, which performance in turn depends on the temperature and static atmospheric pressure conditions around the rotorcraft. Such losses of altitude are referred to as "flyaway" heights, and they are set out in the flight manual of the rotorcraft in the form of charts.

Nevertheless, the crew of a rotorcraft may not be in a position to re-estimate accurately the value of this flyaway height during flight at low speeds of advance or in the proximity of hovering flight. Furthermore, during a rescue operation at sea, variation in the height of the free surface of the water as a result of waves can make readings of the radioaltimeter height scale on a display instrument on board the rotorcraft misleading. In particular, when the rotorcraft is situated vertically above a wave trough, the pilot might think that there is sufficient vertical distance in the event of an engine failure, even though it is important above all to be aware of the position of the rotorcraft relative to wave crests, given that the distance between wave crests and troughs can be several meters.

In order to make it easier to take this flyaway distance into account, the loss of altitude of the rotorcraft, following a failure of an engine during hovering flight, as given in the charts of the flight manual of the rotorcraft as a function of atmospheric pressure, of temperature, and also of the current weight and of the airspeed of the rotorcraft, may in particular be processed in the navigation computer of the rotorcraft, as indeed already happens with certain rotorcraft. Under such circumstances, the pilot can have an estimate of the flyaway distance, but without any direct correlation with the position of the rotorcraft relative to the ground or the free water surface it is overflying.

Furthermore, in the technological background of the invention, Document FR 2 900 385 is known, which document describes a method of piloting a rotorcraft having a plurality of engines driving at least one main rotor. In that method, so long as the rotorcraft has not reached an optimum climb speed, a pitching command is determined so that the rotorcraft accelerates in application of a profile that varies during its takeoff stage, firstly as a function of elapsed time, and secondly as a function of the stage of operation of the engines, and in particular in the event of one of the engines failing. That method then enables the acceleration profile to be adapted if an engine failure occurs during the takeoff stage and before the rotorcraft has reached its optimum climb speed.

The technological background of the invention also includes NASA publication CR-2012-216037 "Aircraft design considerations to meet one engine inoperative (OEI) safety requirements", and NASA publication CR-2012-216038 "One engine inoperative (OEI) and autorotation for heavy lift rotorcraft system", and also the following documents: US 2008/0215197; U.S. Pat. No. 9,387,938; US 2013/0221153; US 2009/0140885; and JP H07/43109.

BRIEF SUMMARY OF THE INVENTION

Under such circumstances, an object of the present invention is to enable the crew of a rotorcraft to know at all times, in the event of an engine failure, whether they have a necessary and sufficient flyaway distance relative to the free surface of water and in spite of the height fluctuations due to waves.

The present invention thus provides a method and a device for determining and displaying a flyaway distance for a rotorcraft while taking account of the height of waves so as to overcome the above-mentioned limitations. The method and the device are for rotorcraft having at least two engines and that are used for operations, in particular emergency and rescue operations, that are performed over a free surface of water, such as the sea, a lake, or any extent of water.

In this context, the invention provides firstly a method of determining and displaying a flyaway distance $H_{FlyA}$ of a rotorcraft in the event of a failure of an engine of the rotorcraft, while taking account of variation in the height of waves above which the rotorcraft is flying, the method comprising the following steps:

a first determination for determining a flyaway distance $H_{FlyA}$ of the rotorcraft in the event of a failure of an engine of the rotorcraft under current flying conditions of the rotorcraft;

a second determination for determining a maximum position of the waves above which the rotorcraft is flying; and displaying the flyaway distance $H_{FlyA}$ and the maximum position of the waves on a display instrument for displaying a vertical position of the rotorcraft.

In order to perform the method of the invention, the rotorcraft may include in particular:

devices for determining current flying conditions of the rotorcraft, these current flying conditions typically being atmospheric pressure and temperature outside the rotorcraft together with the current weight and the airspeed of the rotorcraft;

a device for measuring a current height $H_{Cur}$ of the rotorcraft relative to the waves;

at least one memory storing in particular calculation instructions and data corresponding to the operation of the rotorcraft, such as charts from the flight manual of the rotorcraft;

at least one calculator suitable for executing the calculation instructions; and at least one display instrument for displaying the vertical position of the rotorcraft.

The rotorcraft may also include at least one device for measuring a first current altitude $Z_{Cur}$ of the rotorcraft.

The maximum position of the waves over which the rotorcraft is flying may be constituted by an estimate of the vertical position, i.e. a height position, of the highest wave among the waves over which the rotorcraft is flying. Such a vertical position is defined parallel to the direction of the Earth's gravity.

By way of example, this maximum position of the waves is constituted by estimating the vertical position of the highest wave that the rotorcraft is likely to overfly at the current instant, or else by estimating the vertical position of the highest wave that the rotorcraft has flown over since starting the emergency operation.

By way of example, the display instrument of the rotorcraft that displays the flyaway distance $H_{FlyA}$ and the maximum position of the waves may be a barometric altitude indicator of the rotorcraft or else a relative height indicator of the rotorcraft giving the height above the ground or the free water surface being overflown by the rotorcraft. The term "current relative height" of the rotorcraft is used to mean the current vertical distance between the rotorcraft and the ground or the free water surface.

The barometric altitude of the rotorcraft is provided by a barometric altimeter of the rotorcraft, whereas the relative height of the rotorcraft is provided by a measuring instrument of the rotorcraft commonly referred to as a "radioaltimeter", or else by other types of radar.

Whatever the instrument for displaying the vertical position of the rotorcraft, the flyaway distance $H_{FlyA}$ is displayed by being positioned relative to the maximum position of the waves over which the rotorcraft is flying. By way of example, the symbol used for displaying this flyaway distance $H_{FlyA}$ may be a strip corresponding to the flyaway distance $H_{FlyA}$, with the base of the strip, i.e. its bottom end, being positioned at the maximum position of the waves.

As a result, so long as the indicated current position of the rotorcraft is situated above this symbol for the flyaway distance $H_{FlyA}$, the crew of the rotorcraft knows advantageously, e.g. on engaging an emergency operation, that a sufficient flyaway distance is available in the event of an engine failing. This flyaway distance is advantageously indicated to the pilot of the rotorcraft while taking account of variation in the height of the free water surface due to the presence of waves. This emergency operation can thus be undertaken in complete safety, even in the event of an engine failing. In contrast, if the current position of the rotorcraft is indicated as being below the symbol for the flyaway distance $H_{FlyA}$, then the crew of the rotorcraft knows that sufficient flyaway distance is not available in the event of an engine failure, and that the altitude of the rotorcraft needs to be increased before it is safe to begin an emergency operation.

Furthermore, the maximum position of the waves above which the rotorcraft is flying may be defined by a maximum altitude $Z_{Max}$ of the waves, this maximum position of the waves thus being defined in absolute manner relative to a fixed reference frame, namely the mean free surface of water forming in particular seas and oceans. Such a maximum position of the waves is used in particular when the instrument for displaying the vertical position of the rotorcraft that is used by the method of the invention is an indicator of the barometric altitude of the rotorcraft.

The maximum position of the waves may also be defined as a maximum vertical distance $H_{Max}$ of the wave crests above the current position of the waves. Such a maximum position of the waves is used in particular when the display instrument is an indicator of the relative height of the rotorcraft above the ground or the free water surface over which the rotorcraft is flying.

In addition, in order to anticipate the potential presence of a wave that is higher than the preceding waves, it is possible to use a safety margin $H_{Mrgn}$. For example, the position of the base of the symbol for the flyaway distance $H_{FlyA}$ on the display instrument of the rotorcraft may be defined by the maximum position of the waves above which the rotorcraft is flying, plus the safety margin $H_{Mrgn}$.

The safety margin $H_{Mrgn}$ may be equal to a constant value that is predefined before the flight of the rotorcraft, e.g. 15 feet (15 ft), where one foot is equal to 0.3048 meters. The safety margin $H_{Mrgn}$ may also be equal to a value that can be modified by a pilot of the rotorcraft during the emergency operation, in particular depending on the state of the free water surface, and in particular the amplitude and the period of the waves. The safety margin $H_{Mrgn}$ may also be equal to a predefined percentage of the flyaway distance $H_{FlyA}$, with the safety margin $H_{Mrgn}$ then being bounded by a predefined minimum value. The predefined percentage may for example be equal to 15%, and the predefined minimum value may be equal to 15 ft.

The first determination for determining the flyaway distance $H_{FlyA}$ of the rotorcraft is performed by using charts present in the flight manual of the rotorcraft and supplying the flyaway distance $H_{FlyA}$ of the rotorcraft as a function of the flying conditions of the rotorcraft. This first determination for determining the flyaway distance $H_{FlyA}$ of the rotorcraft may be performed continuously, or else only while the rotorcraft is flying at low speed, e.g. as soon as the airspeed of the rotorcraft becomes less than or equal to a speed threshold. By way of example, this speed threshold may be equal to the takeoff safety speed (VTOSS) of the rotorcraft. As a result, this speed threshold varies from one rotorcraft to another and may for example be equal to 45 knots, where one knot is equal to 1.852 kilometers per hour.

Under such circumstances, this first determination for determining the flyaway distance $H_{FlyA}$ of the rotorcraft may comprise the following substeps:

a preliminary step of translating into software the charts that provide the flyaway distance $H_{FlyA}$ of the rotorcraft depending on the flying conditions of the rotorcraft, this preliminary step being performed when installing the method of the invention in the rotorcraft;

substeps of determining the current flying conditions of the rotorcraft; and a final step of estimating the flyaway distance $H_{FlyA}$ of the rotorcraft from the current flying conditions of the rotorcraft and from the charts.

The charts are stored in at least one memory of the rotorcraft and the calculator of the rotorcraft estimates the flyaway distance $H_{FlyA}$ depending on the current values of the flying conditions as measured or as estimated.

The substeps of determining the current flying conditions of the rotorcraft comprise:

a first measurement for measuring temperature outside the rotorcraft;

a second measurement for measuring atmospheric pressure outside the rotorcraft;

a third measurement for measuring the airspeed of the rotorcraft; and a third determination for determining the current weight of the rotorcraft.

Atmospheric pressure and temperature outside the rotorcraft are measured by dedicated sensors that are conventionally present on a rotorcraft.

The airspeed of the rotorcraft may be measured in full, i.e. in three dimensions, or else only in the longitudinal direction of the rotorcraft. Specifically, pilots preferably perform emergency operations of this type by causing the nose of the rotorcraft to face the wind so as to reduce its sensitivity to turbulence. Under such circumstances, this longitudinal component of the airspeed of the rotorcraft generally constitutes a good approximation of the total airspeed of the rotorcraft, which approximation is sufficient for the method of the invention.

The airspeed of the rotorcraft may be measured by a wind gauge, e.g. of the Pitot probe type, of the speed indicated by internal means (VIMI) type as described in Documents FR 2 282 644 and FR 2 565 270, of the ultrasound type, or indeed of the light detection and ranging (LIDAR) type.

Finally, the current weight of the rotorcraft may be estimated by a dedicated device or else directly by the crew of the rotorcraft, typically by subtracting the weight of the fuel that has been consumed from the takeoff weight of the rotorcraft, possibly while also taking account of passengers and payloads that might possibly have been taken on board or else unloaded.

Thereafter, the second determination for determining the maximum position of the waves above which the rotorcraft is flying, comprises:

an initialization for initializing a maximum altitude $Z_{Max}$ of the waves above which the rotorcraft is flying;

a fourth measurement for measuring a current relative height $H_{Cur}$ of the rotorcraft above the waves at a predefined position relative to the rotorcraft;

a fifth measurement for measuring a first current altitude $Z_{Cur}$ of the rotorcraft;

a fifth determination for determining a second current altitude $Z_{Wav}$ of the waves at the predefined position relative to the rotorcraft, the second current altitude $Z_{Wav}$ being equal to the difference between the first current altitude $Z_{Cur}$ of the rotorcraft and the current relative height $H_{Cur}$, i.e.:

$$Z_{Wav} = Z_{Cur} - H_{Cur}$$

a first comparison for comparing the maximum altitude $Z_{Max}$ and the second current altitude $Z_{Wav}$ of the waves serving to define a new value for the maximum altitude $Z_{Max}$.

This initialization of the maximum altitude $Z_{Max}$ of the waves is performed when starting the method of the invention, e.g. while the rotorcraft is preparing to undertake an emergency operation. During this initialization of the maximum altitude $Z_{Max}$ of the waves, the maximum altitude $Z_{Max}$ may be defined as zero, or else equal to the second current altitude $Z_{Wav}$ of the waves. The second current altitude $Z_{Wav}$ of the waves is the absolute altitude of the waves, i.e. relative to the mean free surface of water forming in particular seas and oceans. Preferably, the maximum altitude $Z_{Max}$ is defined during this initialization as being equal to the second current altitude $Z_{Wav}$ of the waves.

Furthermore, the current relative height $H_{Cur}$ of the rotorcraft above the waves is the vertical distance, i.e. as defined parallel to the direction of the Earth's gravity, between the rotorcraft and the current position of the waves constituting the free water surface being overflown by the rotorcraft. This current position of the waves is situated at the predefined position relative to the rotorcraft.

Thereafter, the fourth measurement for measuring a current relative height $H_{Cur}$ of the rotorcraft may be provided by a measuring instrument of the radioaltimeter type. This fourth measurement for measuring the current relative height $H_{Cur}$ may also be provided by other types of radar, such as an ultrasound type device or indeed a LIDAR type device. This fourth measurement for measuring the current relative height $H_{Cur}$ may for example be taken vertically relative to the rotorcraft, with the predefined position relative to the rotorcraft then being situated vertically below the rotorcraft. The current position of the waves is then situated vertically below the rotorcraft, and this applies in particular with an instrument of the radioaltimeter type.

This fourth measurement for measuring the current relative height $H_{Cur}$ may also be taken at a predefined distance from the rotorcraft, preferably ahead of the rotorcraft, with this predefined position relative to the rotorcraft then being situated at that predefined distance from the rotorcraft. The current position of the waves is then situated at this predefined distance from the rotorcraft. Such a fourth measurement ahead of the rotorcraft can be taken by way of example by using an ultrasound type device or indeed a LIDAR type device, and it serves advantageously to anticipate the arrival of the waves over which the rotorcraft is flying.

The fifth measurement for measuring the first current altitude $Z_{Cur}$ of the rotorcraft may be taken by means of an altimeter providing a barometric altitude measurement, e.g. by means of a global navigation satellite system (GNSS) receiver that gives an absolute altitude relative to the mean free surface of the water forming in particular seas and oceans, or else by integrating the vertical speed of the rotorcraft.

The fifth determination for determining the second current altitude $Z_{Wav}$ of the waves is thus defined, at the position that is predefined relative to the rotorcraft where the current relative height $H_{Cur}$ was measured, by the difference between the first current altitude $Z_{Cur}$ of the rotorcraft and the current relative height $H_{Cur}$, such that:

$$Z_{Wav}=Z_{Cur}-H_{Cur}$$

Finally, the maximum altitude $Z_{Max}$ is defined by the first comparison that is performed between said maximum altitude $Z_{Max}$ and the second current altitude $Z_{Wav}$ of the waves.

The maximum altitude $Z_{Max}$ may then be defined as the maximum value reached by the second current altitude $Z_{Wav}$ of the waves throughout the emergency operation being performed by the rotorcraft. As a result, when the maximum altitude $Z_{Max}$ is less than the second current altitude $Z_{Wav}$ of the waves, the maximum altitude $Z_{Max}$ takes the value of the second current altitude $Z_{Wav}$, and when the maximum altitude $Z_{Max}$ is greater or equal to the second current altitude $Z_{Wav}$ of the waves, the maximum altitude $Z_{Max}$ does not change value.

The maximum altitude $Z_{Max}$ can also be defined by a filter having a long time constant. Under such circumstances, when the maximum altitude $Z_{Max}$ is less than or equal to the second current altitude $Z_{Wav}$ of the waves, the maximum altitude $Z_{Max}$ takes the value of the second current altitude $Z_{Wav}$, with the long time constant filter then being initialized, and thereafter, so long as the maximum altitude $Z_{Max}$ is greater than the second current altitude $Z_{Wav}$ of the waves, the maximum altitude $Z_{Max}$ varies following a predefined decreasing curve.

The term "long time constant" should be understood in comparison with the time between two waves, corresponding to the period of the waves. This wave period typically lies in the range 7 seconds (s) to 12 s, and the predefined decreasing curve of the filter needs to make use of a time constant that is several times greater than the wave period. For example, the time constant may lie in the range 120 s to several minutes. Specifically, an observation time of a few minutes makes it possible to obtain a good estimate of the maximum position of the waves, particularly since such an observation can begin well before the rotorcraft starts hovering, while it is approaching the zone of operation.

This predefined decreasing curve may begin with a horizontal level during which the maximum altitude $Z_{Max}$ is constant over a predetermined duration, typically of the order of one or two wave periods, prior to decreasing slowly. Such a horizontal level serves in particular to avoid repeated variations in the maximum altitude $Z_{Max}$ between two waves.

The predefined decreasing curve may decrease regularly with a slope that is constant, depending on the difference between the maximum altitude $Z_{Max}$ and the second current altitude $Z_{Wav}$ of the waves. This predefined decreasing curve may equally well be a decreasing exponential curve in which the initial slope may depend on the difference between the maximum altitude $Z_{Max}$ and the second current altitude $Z_{Wav}$.

By way of example, the altitude Z may follow an exponential relationship Z(t) when firstly the exponential relationship satisfies the following differential equation:

$$Z_{Final}=\tau \cdot \dot{Z}(t)+Z(t)$$

where $\tau$ is a constant, and when secondly at the initial instant $t_{initial}$:

$$Z_{Initial}=Z(t_{Initial})$$

and the derivative of altitude or "decreasing slope" is given by:

$$\dot{Z}(t_{Initial})=\frac{Z_{Final}-Z_{Initial}}{\tau}$$

The term $\tau$ is a time constant corresponding to a duration and it is expressed in seconds. This time constant $\tau$ may be interpreted as a filter time horizon, representing the reciprocal of the characteristic angular frequency of the poles of the filter or of the transfer function under consideration, this angular frequency being expressed in radians per second.

During the second determination for determining the maximum position of the waves, the measurements, and also the fifth determination for determining the second current altitude $Z_{Wav}$ of the waves, and indeed the first comparison for comparing the maximum altitude $Z_{Max}$ with the second current altitude $Z_{Wav}$ of the waves, may either be performed continuously or else they may be performed at a sampling frequency. The sampling frequency is preferably defined in such a manner that it is greater than, and indeed considerably greater than, the frequency of the waves. Typically, the sampling frequency should be equal to 10 hertz.

The second determination for determining the maximum position of the waves thus serves to obtain the maximum altitude $Z_{Max}$ of the waves directly as the maximum position of the waves.

This maximum altitude $Z_{Max}$ of the waves can then be used to display the symbol for the flyaway distance $H_{FlyA}$ of a barometric altitude indicator of the rotorcraft, the base of the flyaway distance symbol $H_{FlyA}$ being positioned at this maximum altitude $Z_{Max}$.

When the first current altitude $Z_{Cur}$ of the rotorcraft is not provided by a barometric altimeter, it is necessary to reset the first current altitude $Z_{Cur}$ of the rotorcraft and the scale of the barometric altitude indicator of the rotorcraft in order to display the maximum altitude $Z_{Max}$. A scale correction value $V_{Corr}$ equal to the difference between the barometric altitude $Z_{Bar}$ and the first current altitude $Z_{Cur}$ of the rotorcraft is then taken into account as follows:

$$V_{Corr} = Z_{Bar} - Z_{Cur}$$

The position of the base of the symbol corresponding to the flyaway distance $H_{FlyA}$ is then given by:

$$Z_{Max} + Z_{Bar} - Z_{Cur}$$

When the safety margin $H_{Mrgn}$ is taken into account, the position of the base of the symbol corresponding to the flyaway distance $H_{FlyA}$ is then:

$$Z_{Max} + Z_{Bar} - Z_{Cur} + H_{Mrgn}$$

Furthermore, when the maximum position of the waves is a maximum vertical distance $H_{Max}$ for the wave crests relative to the current position of the waves, the second determination for determining the maximum position of the waves includes an additional step comprising a sixth determination for determining the maximum vertical distance $H_{Max}$. During this sixth determination for determining the maximum vertical distance $H_{Max}$, a scale transfer value between the altitude reference frame and the relative height reference frame and equal to the second current altitude $Z_{Wav}$ of the waves is subtracted from the maximum altitude $Z_{Max}$ in order to obtain this maximum vertical distance $H_{Max}$. This maximum vertical distance $H_{Max}$ is thus equal to the difference between the maximum altitude $Z_{Max}$ and the second current altitude $Z_{Wav}$ of the waves, i.e.:

$$H_{Max} = Z_{Max} - Z_{Wav} = Z_{Max} - (Z_{Cur} - H_{Cur})$$

The symbol for the flyaway distance $H_{FlyA}$ may then be displayed on the relative height indicator of the rotorcraft giving the height above the ground or the free water surface, with the base of the symbol for the flyaway distance $H_{FlyA}$ being positioned at the maximum vertical distance $H_{Max}$ facing the reference of this relative height indicator of the rotorcraft, this reference representing the free water surface in the present situation.

When a safety margin $H_{Mrgn}$ is taken into account, the position of the base of the symbol corresponding to the flyaway distance $H_{FlyA}$ is then:

$$Z_{Max} - (Z_{Cur} - H_{Cur}) + H_{Mrgn}$$

The invention also provides a device for determining and displaying a flyaway distance $H_{FlyA}$ of a rotorcraft in the event of an engine of the rotorcraft failing and while taking account of variation in the height of waves over which the rotorcraft is flying, the device comprising:

devices for determining current flying conditions of the rotorcraft;

a device for measuring a current relative height $H_{Cur}$ of the rotorcraft above the waves at a predefined position relative to the rotorcraft;

at least one measuring device for measuring a first current altitude $Z_{Cur}$ of the rotorcraft;

at least one memory storing calculation instructions, charts providing the flyaway distance $H_{FlyA}$ for the rotorcraft depending on the flying conditions of the rotorcraft, the maximum altitude $Z_{Max}$, and possibly, where applicable, the takeoff weight of the rotorcraft;

at least one calculator suitable for executing the calculation instructions; and at least one display instrument for displaying a vertical position of the rotorcraft.

The device then serves to perform the above-described method in order to display a symbol on the display instrument corresponding to the flyaway distance $H_{FlyA}$, with the base of the symbol being positioned at the maximum position of the waves, and while taking account of any safety margin $H_{Mrgn}$.

BRIEF DESCRIPTION OF THE DRAWINGS

The invention and its advantages appear in greater detail in the context of the following description of implementations given by way of illustration and with reference to the accompanying figures, in which.

DETAILED DESCRIPTION OF THE INVENTION

Elements present in more than one of the figures are given the same references in each of them.

Figure 1:
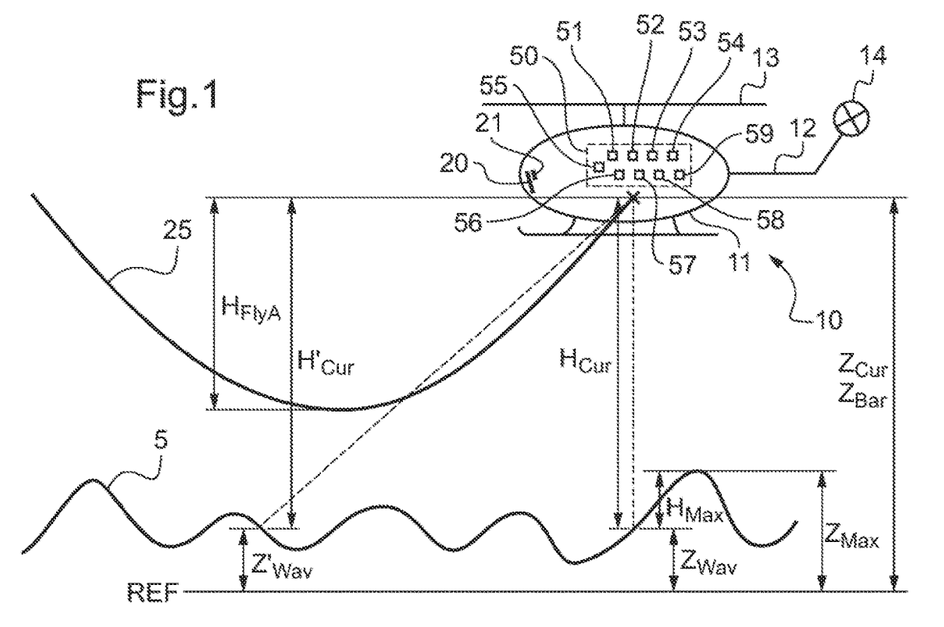
FIG. 1 shows a rotorcraft having a device for determining and displaying a flyaway distance for a rotorcraft while taking account of wave height.

FIG. 1 shows a rotorcraft 10, also referred to as a "rotary wing aircraft" flying over a free water surface 5. The rotorcraft 10 comprises in particular a fuselage 11, a tail boom 12, a main rotor 13 providing it with lift and possibly also propulsion, and a tail rotor 14 positioned at the rear end of the tail boom 12. The rotorcraft 10 also has two engines that are not shown. The rotorcraft 10 is for use in particular in performing search and rescue missions at sea. During such operations, the rotorcraft 10 needs to act in complete safety while hovering or while flying at low speeds and at very low altitude in an environment that is often disturbed, and in particular with a free water surface that is rough, possibly associated with poor visibility.

The rotorcraft 10 also has a device 50 for determining and displaying a flyaway distance $H_{FlyA}$ of a rotorcraft while taking account of the height of waves, together with an instrument panel 20 having a display instrument 21 for displaying a vertical position of the rotorcraft 10. The device 50 for determining and displaying a flyaway distance $H_{FlyA}$ of a rotorcraft includes devices 51-54 for determining current flying conditions of the rotorcraft 10, specifically a first sensor 51 for measuring temperature outside the rotorcraft 10, a second sensor 52 for measuring atmospheric pressure outside the rotorcraft 10, a wind gauge 53 for measuring airspeed relative to the rotorcraft 10, and a device 54 for determining a current weight of the rotorcraft 10.

The device 50 for determining and displaying a flyaway distance $H_{FlyA}$ of a rotorcraft also includes a measuring device 55 for measuring a current relative height $H_{Cur}$ of the rotorcraft 10 above the ground or the free water surface over which the rotorcraft is flying, and at least one measuring device 56-57 for measuring a first current altitude $Z_{Cur}$ of the rotorcraft 10, a memory 58, and a calculator 59. The memory 58 serves in particular to store calculation instructions that the calculator 59 is suitable for executing.

The device 50 for determining and displaying a flyaway distance $H_{FlyA}$ of a rotorcraft also makes use of the display instrument 21 of the rotorcraft 10. Furthermore, the devices 51-54 for determining current flying conditions of the rotorcraft 10, the measuring device 55 for measuring a current relative height $H_{Cur}$ above the ground or the free water surface, and each device 56-57 for measuring a first current altitude $Z_{Cur}$ of the rotorcraft 10 may be shared with other pieces of equipment of the rotorcraft 10.

The device 55 for measuring a current relative height $H_{Cur}$ of the rotorcraft 10 above the waves may be a radioaltimeter performing this measurement substantially vertically under the rotorcraft 10. This device 55 for measuring a current relative height $H_{Cur}$ of the rotorcraft 10 may also be an ultrasound type device or a LIDAR type device enabling this measurement to be taken at a predefined distance from the rotorcraft, preferably in front of the rotorcraft, so as to act advantageously to anticipate the arrival of waves over which the rotorcraft 10 is about to fly.

The device 56-57 for measuring the first current altitude $Z_{Cur}$ of the rotorcraft 10 may be a global navigation system (GNSS) receiver 56 supplying an absolute altitude relative to the mean free surface of the water constituting in particular seas and oceans, or indeed an altimeter 57 providing a barometric altitude measurement. The first current altitude $Z_{Cur}$ of the rotorcraft 10 may also be obtained by integrating a vertical speed of the rotorcraft 10.

Figure 2:
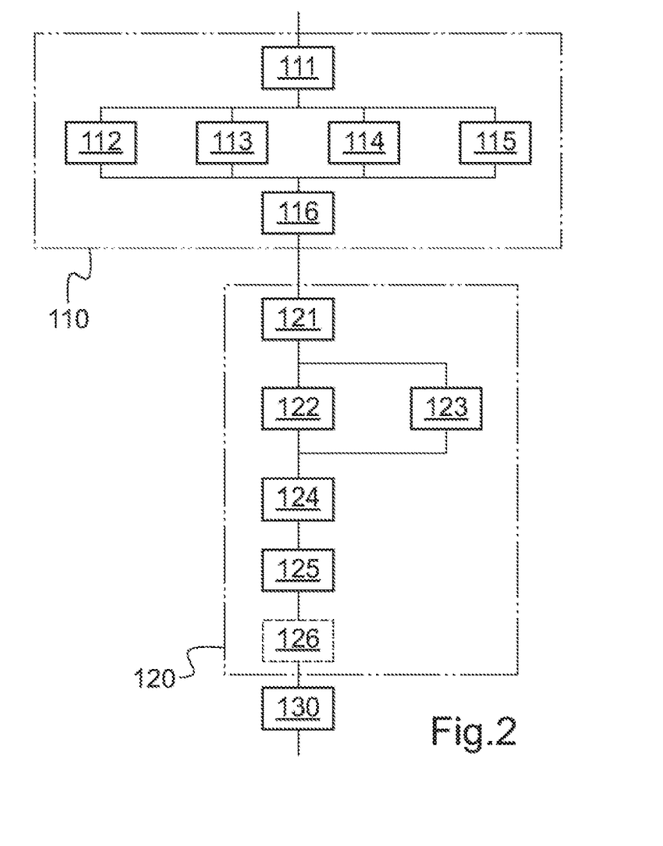
FIG. 2 is a block diagram of a method of determining and displaying a flyaway distance for a rotorcraft while taking account of wave height.

The memory 58 stores calculation instructions serving in particular to perform the method of determining and displaying a flyaway distance $H_{FlyA}$ of a rotorcraft while taking account of the height of waves, which method is summarized diagrammatically in FIG. 2.

The method comprises three main steps:
first determination 110 for determining a flyaway distance $H_{FlyA}$ of the rotorcraft 10 in the event of an engine of the rotorcraft 10 failing and in the current flying conditions of the rotorcraft 10;
second determination 120 for determining a maximum position of waves over which the rotorcraft 10 is flying; and
displaying 130 the flyaway distance $H_{FlyA}$ and the maximum position on the display instrument 21.

The first determination 110 for determining the flyaway distance $H_{FlyA}$ of the rotorcraft 10 comprises a preliminary step 111 performed when installing the method of the invention in the rotorcraft 10, this preliminary step 111 consisting in translating into software the charts that provide the flyaway distance $H_{FlyA}$ of the rotorcraft 10 depending on the flying conditions of the rotorcraft 10. The memory 58 stores the charts providing the flyaway distance $H_{FlyA}$ of the rotorcraft 10 depending on the flying conditions of the rotorcraft 10.

The flyaway distance $H_{FlyA}$, as shown in FIG. 1, is the altitude that the rotorcraft 10 needs to lose following a failure of an engine of the rotorcraft 10 in order to reach a speed along a flight path 25 that is sufficient to enable the rotorcraft 10 to maintain a constant altitude or even to climb a little, while using only the power that is available from the engine that remains in operation.

The first determination 110 for determining the flyaway distance $H_{FlyA}$ of the rotorcraft 10 also includes substeps 112-115 of determining current flying conditions of the rotorcraft 10:
a first measurement 112 for measuring temperature outside the rotorcraft 10, taken by means of the first sensor 51;
a second measurement 113 for measuring atmospheric pressure outside the rotorcraft 10, taken by means of the second sensor 52;
a third measurement 114 for measuring the airspeed of the rotorcraft 10, as taken by means of the wind gauge 53; and
a third determination 115 for determining a current weight of the rotorcraft 10, taken by means of the device 54 for determining the current weight of the rotorcraft 10.

The third determination 115 for determining the current weight of the rotorcraft 10 may also be performed directly by the crew of the rotorcraft 10 by subtracting the weight of fuel that has already been consumed from the takeoff weight, possibly while also taking account of passengers and payloads that may be taken on board or unloaded. The memory 58 then stores the takeoff weight of the rotorcraft 10.

The first determination 110 for determining the flyaway distance $H_{FlyA}$ of the rotorcraft 10 finally includes a final step 116 of estimating the flyaway distance $H_{FlyA}$ of the rotorcraft 10 as performed by the calculator 59, on the basis of the current flying conditions of the rotorcraft 10 and of the charts.

Furthermore, the maximum position of the waves over which the rotorcraft is flying, as determined during the second determination 120, may be defined by a maximum wave altitude $Z_{Max}$ or indeed by a maximum vertical distance $H_{Max}$ of the wave crests relative to the current position of the waves. The maximum altitude $Z_{Max}$ of the waves is defined in absolute manner relative to a fixed reference frame REF and is used for a display instrument 21 that indicates in particular the barometric altitude of the rotorcraft 10. The maximum vertical distance $H_{Max}$ of the waves is used when the display instrument 21 is an instrument for giving the height of the rotorcraft above the ground or the free water surface over which it is flying.

The reference frame REF and the maximum altitude $Z_{Max}$ of the waves and the maximum vertical distance $H_{Max}$ of the wave crests relative to the current position of the waves are shown in FIG. 1. The reference frame REF is generally constituted by the mean free surface of the water forming in particular seas and oceans.

In addition, the maximum vertical distance $H_{Max}$ of the wave crests relative to the current position of the waves is determined by taking the difference between the maximum altitude $Z_{Max}$ and a second current altitude $Z_{Wav}$ of the waves. Specifically, whatever this maximum position of the waves, the second determination 120 for determining the maximum position of the waves above which the rotorcraft 10 is flying includes firstly an initialization 121 of a maximum altitude $Z_{Max}$ of the waves above which the rotorcraft 10 is flying. During this initialization 121, the maximum altitude $Z_{Max}$ is preferably defined as being equal to the second current altitude $Z_{Wav}$ of the waves.

Thereafter, a fourth measurement 122 for measuring a current relative height $H_{Cur}$ of the rotorcraft 10 above the waves is taken at a position that is predefined relative to the rotorcraft 10 by the measuring device 55. The position that is predefined relative to the rotorcraft 10 may be substantially vertically below the rotorcraft 10, or it may be at a predefined distance from the rotorcraft 10, preferably ahead of the rotorcraft 10, as shown in FIG. 1.

A fifth measurement 123 is taken for measuring the first current altitude $Z_{Cur}$ of the rotorcraft 10, preferably simultaneously with the fourth measurement 122, by means of the measuring device 56-57. This fifth measurement 123 may also be taken sequentially relative to the fourth measurement 122.

After the fourth measurement 122 and the fifth measurement 123, a fifth determination 124 is performed by the calculator 59 for determining a second current altitude $Z_{Wav}$ of the waves at the predefined position relative to the rotorcraft 10, corresponding to the current position of the waves. This second current altitude $Z_{Wav}$ is equal to the difference between the first current altitude $Z_{Cur}$ and the current relative height $H_{Cur}$ of the rotorcraft 10, i.e.:

$$Z_{Wav} = Z_{Cur} - H_{Cur}$$

Finally, a first comparison 125 is performed by the calculator 59 between the maximum altitude $Z_{Max}$ and the second current altitude $Z_{Wav}$ in order to define a new value for the maximum altitude $Z_{Max}$.

During the first comparison 125, when the maximum altitude $Z_{Max}$ is less than the second current altitude $Z_{Wav}$ of the waves, the maximum altitude $Z_{Max}$ may take the value of the second current altitude $Z_{Wav}$, whereas the maximum altitude $Z_{Max}$ remains unchanged when the maximum altitude $Z_{Max}$ is greater than or equal to the second current altitude $Z_{Wav}$ of the waves. As a result, the maximum altitude $Z_{Max}$ is defined as the maximum value reached by the second current altitude $Z_{Wav}$ of the waves throughout the emergency operation being performed by the rotorcraft 10.

During the first comparison 125, the maximum altitude $Z_{Max}$ may also be defined so as to take account of possible variation in the amplitude of the waves, which might be a reduction in amplitude. For this purpose, when the maximum altitude $Z_{Max}$ is less than or equal to the second current altitude $Z_{Wav}$ of the waves, the maximum altitude $Z_{Max}$ takes the value of the second current altitude $Z_{Wav}$ and so long as the maximum altitude $Z_{Max}$ is greater than the second current altitude $Z_{Wav}$, the maximum altitude $Z_{Max}$ varies following a predefined decreasing curve.

Figure 5:
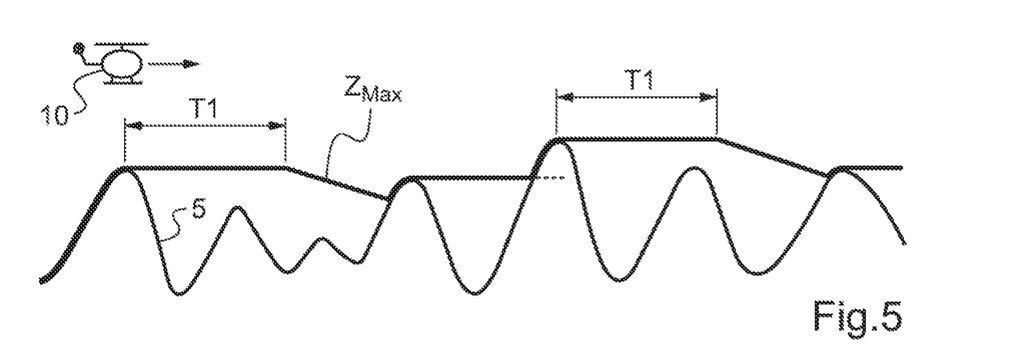
FIGS. 5 and 6 show two examples of how the maximum altitude of waves can vary.
Figure 6:
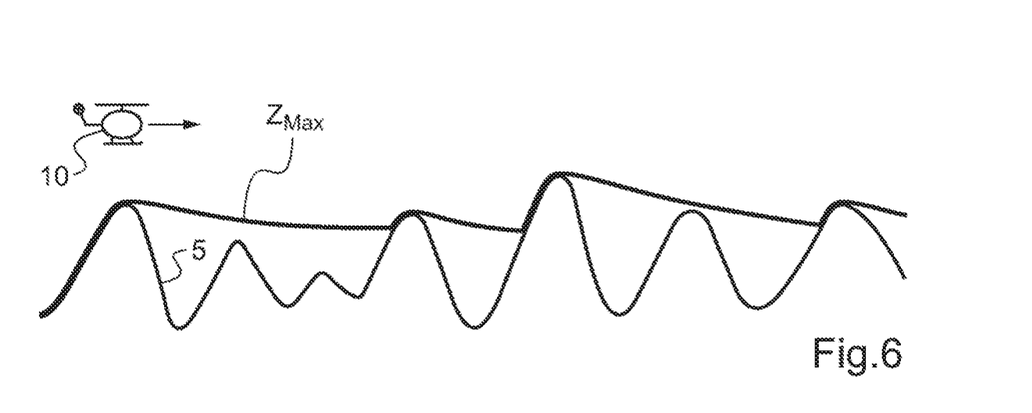

Two examples of varying the maximum altitude $Z_{Max}$ of the waves using predefined decreasing curves are shown in FIGS. 5 and 6.

In a first example shown in FIG. 5, the predefined decreasing curve begins with a horizontal level during which the maximum altitude $Z_{Max}$ is constant over a predetermined duration $T_1$, typically of the order of one or two wave periods, prior to decreasing slowly and regularly with a slope that is constant depending on the difference between the maximum altitude $Z_{Max}$ and the second current altitude $Z_{Wav}$ of the waves.

It is then observed, initially, that the maximum altitude $Z_{Max}$ follows the free water surface 5 of the second current altitude $Z_{Wav}$ as it increases, and then after the first crest of a wave, the maximum altitude $Z_{Max}$ is constant throughout the predetermined duration $T_1$, with waves being of smaller amplitude during this determined duration $T_1$. Thereafter, the maximum altitude $Z_{Max}$ decreases with a constant slope so long as the second current altitude $Z_{Wav}$ of the waves is less than the maximum altitude $Z_{Max}$. As soon as the constant slope meets the free water surface 5, the maximum altitude $Z_{Max}$ follows the free water surface 5, with the maximum altitude $Z_{Max}$ being equal to the second current altitude $Z_{Wav}$ of the waves, which altitude is increasing. Once the second current altitude $Z_{Wav}$ starts decreasing again, the maximum altitude $Z_{Max}$ remains level and is constant until meeting a wave for which the second current altitude $Z_{Wav}$ is greater than or equal to the maximum altitude $Z_{Max}$. Thereafter, the maximum altitude $Z_{Max}$ remains level and is constant during the predetermined duration $T_1$, and then decreases with a constant slope so long as the second current altitude $Z_{Wav}$ of the waves remains less than the second maximum altitude $Z_{Max}$ of the waves.

In a second example shown in FIG. 6, the predefined decreasing curve decreases following a decreasing exponential curve. As above, it can then be seen that the maximum altitude $Z_{Max}$ begins by following the free surface of the water 5 of increasing second current altitude $Z_{Wav}$, and then after the first crest of a wave, the maximum altitude $Z_{Max}$ decreases following the predefined decreasing exponential curve so long as the second current altitude $Z_{Wav}$ of the waves remains less than the maximum altitude $Z_{Max}$. As soon as this decreasing curve meets the free water surface 5, the maximum altitude $Z_{Max}$ follows the free water surface 5, with the maximum altitude $Z_{Max}$ being equal to the second current altitude $Z_{Max}$ of the waves, which altitude is increasing. As soon as the second current altitude $Z_{Wav}$ decreases once again, the maximum altitude $Z_{Max}$ decreases following the predefined decreasing curve until meeting a wave for which the second current altitude $Z_{Wav}$ is greater than or equal to the maximum altitude $Z_{Max}$.

Furthermore, when the maximum position of the waves is the maximum vertical distance $H_{Max}$ of the wave crests relative to the current position of the waves, the maximum vertical distance $H_{Max}$ is determined during a sixth determination 126 for determining the maximum vertical distance $H_{Max}$ included in the second determination 120 for determining the maximum position of the waves by subtracting the second current altitude $Z_{Wav}$ of the waves from the maximum altitude $Z_{Max}$:

$$H_{Max} = Z_{Max} - Z_{Wav} = Z_{Max} - (Z_{Cur} - H_{Cur})$$

Consequently, the method of determining and displaying a flyaway distance $H_{FlyA}$ for a rotorcraft while taking account of the height of waves serves advantageously to determine firstly the flyaway distance $H_{FlyA}$ depending on the current flying conditions of the rotorcraft 10, and secondly to determine the maximum position of the waves over which the rotorcraft 10 is flying during an emergency operation, and which needs to be taken into account in the event of an engine failure in order to be able to reach safely the minimum speed that is required with only one engine operational.

The first determination 110 for determining a flyaway distance $H_{FlyA}$ for the rotorcraft 10 and the second determination 120 for determining a maximum position of the waves above which the rotorcraft 10 is flying may be performed in sequential manner or else in simultaneous manner.

Finally, the display 130 of the flyaway distance $H_{FlyA}$ and of the maximum position of the waves on the display instrument 21 serves to inform the crew of the rotorcraft 10 about this flyaway distance $H_{FlyA}$ while taking account of this maximum position of the waves. This flyaway distance $H_{FlyA}$ is displayed in the form of a strip type symbol 80 positioned at the maximum position of the waves.

As a result, prior to beginning an emergency operation, since the display instrument 21 also displays a mark 70 representing the position of the rotorcraft 10, the crew of the rotorcraft 10 can see immediately, and without taking any action, whether a sufficient flyaway distance $H_{FlyA}$ is available in the event of an engine failure. In addition, this flyaway distance $H_{FlyA}$ is displayed and updated during the emergency operation, advantageously while taking account of variations in current flying conditions and variations in the height of the waves, thereby enabling the emergency operation to be performed in complete safety, even in the event of an engine failure occurring.

Figure 3:
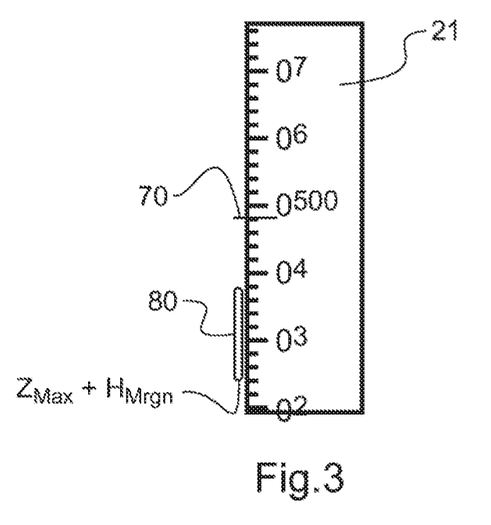
FIGS. 3 and 4 are views of a display instrument displaying a vertical position of the rotorcraft.
Figure 4:
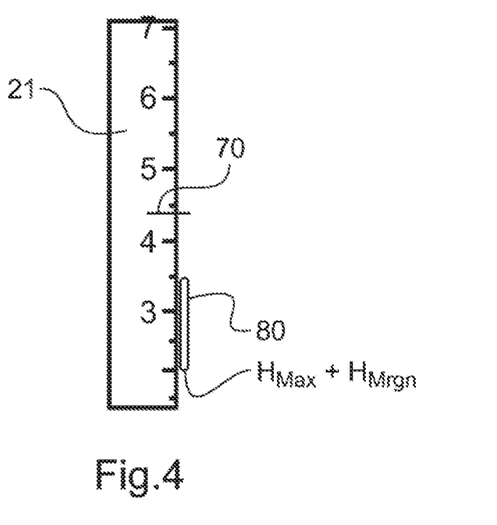

The display instrument 21 may be a barometric altitude indicator of the rotorcraft 10, as shown in FIG. 3, with the maximum position of the waves being the maximum altitude $Z_{Max}$ of the waves, or else it may be an indicator of the relative height of the rotorcraft 10 above the ground or the free water surface over which the rotorcraft 10 is flying, as shown in FIG. 4, the maximum position of the waves being the maximum vertical distance $H_{Max}$ of the wave crests relative to the current position of the waves.

When the display instrument 21 displays a barometric altitude of the rotorcraft 10, and when the first current altitude $Z_{Cur}$ of the rotorcraft 10 is not supplied by a barometric altimeter, a scale correction value equal to the difference between the barometric altitude $Z_{Bar}$ and the first current altitude $Z_{Cur}$ of the rotorcraft 10 is added to the maximum altitude $Z_{Max}$ in order to display 130 the symbol 80.

Furthermore, in both situations, a safety margin $H_{Mrgn}$ may be added to the maximum position of the waves, i.e. the maximum altitude $Z_{Max}$ or else the maximum vertical distance $H_{Max}$.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of determining and displaying a flyaway distance for a rotorcraft in the event of an engine of the rotorcraft failing, while taking account of variation in the height of waves over which the rotorcraft is flying, the rotorcraft having at least two engines, wherein the method comprises the following steps:
   a first determination for determining a flyaway distance of the rotorcraft in the event of an engine of the rotorcraft failing under current flying conditions of the rotorcraft, the flyaway distance being equal to a loss of altitude that is necessary to enable the rotorcraft to achieve a minimum speed following a failure of one of the engines of the rotorcraft;
   a second determination for determining a maximum position of the waves above which the rotorcraft is flying, the maximum position being an estimate of the vertical position of the highest wave among the waves; and
   displaying the flyaway distance and the maximum position on a display instrument of the rotorcraft.

2. The method according to claim 1, wherein the first determination for determining the flyaway distance of the rotorcraft comprises:
   a preliminary step of translating into software the charts that provide the flyaway distance of the rotorcraft depending on the flying conditions of the rotorcraft;
   substeps of determining the current flying conditions of the rotorcraft; and
   a final step of estimating the flyaway distance of the rotorcraft from the current flying conditions of the rotorcraft and from the charts.

3. The method according to claim 2, wherein the substeps of determining the current flying conditions of the rotorcraft comprise:
   a first measurement for measuring temperature outside the rotorcraft;
   a second measurement for measuring atmospheric pressure outside the rotorcraft;
   a third measurement for measuring the airspeed of the rotorcraft; and
   a third determination for determining the current weight of the rotorcraft.

4. The method according to claim 1, wherein the second determination for determining the maximum position of the waves above which the rotorcraft is flying, comprises:
   an initialization for initializing a maximum altitude of the waves above which the rotorcraft is flying;
   a fourth measurement for measuring a current relative height of the rotorcraft above the waves at a predefined position relative to the rotorcraft;
   a fifth measurement for measuring a first current altitude of the rotorcraft;
   a fifth determination for determining a second current altitude of the waves at the predefined position relative to the rotorcraft, the second current altitude being equal to the difference between the first current altitude of the rotorcraft and the current relative height
   a first comparison for comparing the maximum altitude and the second current altitude of the waves, and serving to define a new value for the maximum altitude.

5. The method according to claim 4, wherein during the first comparison, when the maximum altitude is less than the second current altitude of the waves, the maximum altitude takes the value of the second current altitude of the waves.

6. The method according to claim 4, wherein during the first comparison:
   when the maximum altitude is less than or equal to the second current altitude of the waves, the maximum altitude takes the value of the second current altitude; and
   so long as the maximum altitude is greater than the second current altitude of the waves, the maximum altitude varies following a predefined decreasing curve.

7. The method according to claim 6, wherein the predefined decreasing curve comprises a horizontal level during which the maximum altitude is constant over a predetermined duration prior to decreasing.

8. The method according to claim 6, wherein the predefined decreasing curve is a decreasing exponential curve.

9. The method according to claim 4, wherein the predefined position relative to the rotorcraft is situated vertically below the rotorcraft, the current relative height being measured vertically relative to the rotorcraft.

10. The method according to claim 4, wherein the predefined position relative to the rotorcraft is situated at a predefined distance from the rotorcraft, the current relative height being measured at the predefined distance from the rotorcraft in order to anticipate the waves over which the rotorcraft is about to fly.

11. The method according to claim 1, wherein while displaying the flyaway distance, a symbol representing the flyaway distance is displayed on the display instrument of the rotorcraft in such a manner that a base of the symbol is positioned at the maximum position of the waves.

12. The method according to claim 1, wherein while displaying the flyaway distance, a symbol representing the flyaway distance is displayed on the display instrument of the rotorcraft in such a manner that a base of the symbol is positioned at the maximum position of the waves plus a safety margin.

13. The method according to claim 1, wherein, when the display instrument displays a barometric altitude for the rotorcraft, the maximum position of the waves is the maximum altitude plus a scale correction value equal to the difference between the barometric altitude and the first current altitude of the rotorcraft.

14. The method according to claim 1, wherein, when the display instrument displays a relative height of the rotorcraft above the free water surface above which the rotorcraft is flying, the maximum position of the waves is a maximum vertical distance of a crest of the waves relative to a current position of the waves equal to the maximum altitude minus the second current altitude of the waves.

15. A device for determining and displaying a flyaway distance of a rotorcraft in the event of an engine of the rotorcraft failing and while taking account of variation in the height of waves over which the rotorcraft is flying, the rotorcraft having at least two engines, and the device comprising:
 devices for determining current flying conditions of the rotorcraft;
 a device for measuring a current relative height of the rotorcraft above the waves at a predefined position relative to the rotorcraft;
 at least one measuring device for measuring a first current altitude of the rotorcraft;
 at least one memory storing calculation instructions, charts providing the flyaway distance for the rotorcraft depending on the flying conditions of the rotorcraft, a maximum altitude, and where applicable the takeoff weight of the rotorcraft;
 at least one calculator suitable for executing the calculation instructions; and
 at least one display instrument for displaying a vertical position of the rotorcraft;
 wherein the device is configured to perform the method according to claim 1.

16. A method of determining and displaying a flyaway distance for a rotorcraft in the event of an engine of the rotorcraft failing, while taking account of variation in the height of waves over which the rotorcraft is flying, the rotorcraft having at least two engines, wherein the method comprises the following steps:
 determining the flyaway distance of the rotorcraft in the event of an engine of the rotorcraft failing under current flying conditions of the rotorcraft, the flyaway distance being equal to a loss of altitude that is necessary to enable the rotorcraft to achieve a minimum speed following a failure of one of the engines of the rotorcraft;
 determining a maximum position of the waves above which the rotorcraft is flying, the maximum position being an estimate of the vertical position of the highest wave among the waves; and
 displaying the flyaway distance and the maximum position of the waves on a display instrument of the rotorcraft.

17. The method according to claim 16, wherein determining the flyaway distance of the rotorcraft comprises:
 translating into software the charts that provide the flyaway distance of the rotorcraft depending on the flying conditions of the rotorcraft;
 determining the current flying conditions of the rotorcraft; and
 estimating the flyaway distance of the rotorcraft from the current flying conditions of the rotorcraft and from the charts.

18. The method according to claim 17, wherein determining the current flying conditions of the rotorcraft comprise:
 measuring the temperature outside the rotorcraft;
 measuring the atmospheric pressure outside the rotorcraft;
 measuring the airspeed of the rotorcraft; and
 determining the current weight of the rotorcraft; and
 determining the maximum position of the waves above which the rotorcraft is flying, comprises:
 initializing a maximum altitude of the waves above which the rotorcraft is flying;
 measuring a current relative height of the rotorcraft above the waves at a predefined position relative to the rotorcraft;
 measuring a first current altitude of the rotorcraft;
 determining a second current altitude of the waves at the predefined position relative to the rotorcraft, the second current altitude being equal to the difference between the first current altitude of the rotorcraft and the current relative height; and
 comparing the maximum altitude and the second current altitude of the waves, and serving to define a new value for the maximum altitude.

19. The method according to claim 18, wherein during the comparison, when the maximum altitude is less than the second current altitude of the waves, the maximum altitude takes the value of the second current altitude of the waves.

20. The method according to claim 4, wherein during the comparison:
 when the maximum altitude is less than or equal to the second current altitude of the waves, the maximum altitude takes the value of the second current altitude; and
 so long as the maximum altitude is greater than the second current altitude of the waves, the maximum altitude varies following a predefined decreasing curve.

* * * * *